United States Patent
Kana et al.

(10) Patent No.: US 9,939,532 B2
(45) Date of Patent: Apr. 10, 2018

(54) HEADING FOR A HYBRID NAVIGATION SOLUTION BASED ON MAGNETICALLY CALIBRATED MEASUREMENTS

(71) Applicant: Honeywell International Inc., Morristown, NJ (US)

(72) Inventors: Zdenek Kana, Dubnany (CZ); Jindrich Dunik, Plzen (CZ); Milos Sotak, Slavkov u Brna (CZ)

(73) Assignee: Honeywell International Inc., Morris Plains, NJ (US)

( * ) Notice: Subject to any disclaimer, the term of this patent is extended or adjusted under 35 U.S.C. 154(b) by 518 days.

(21) Appl. No.: 14/593,266

(22) Filed: Jan. 9, 2015

(65) Prior Publication Data

US 2016/0202359 A1 Jul. 14, 2016

(51) Int. Cl.
*G01S 19/47* (2010.01)
*G01B 7/00* (2006.01)
(Continued)

(52) U.S. Cl.
CPC ............. *G01S 19/47* (2013.01); *G01B 7/00* (2013.01); *G01C 21/08* (2013.01); *G01C 21/165* (2013.01)

(58) Field of Classification Search
CPC ....... G01S 19/47; G01C 21/08; G01C 21/165; G01B 7/00
(Continued)

(56) References Cited

U.S. PATENT DOCUMENTS

| 6,760,663 | B2 | 7/2004 | Brenner |
| 6,860,023 | B2 | 3/2005 | Manfred et al. |

(Continued)

FOREIGN PATENT DOCUMENTS

| EP | 2264485 | 12/2010 |
| WO | 2014022664 | 2/2014 |

OTHER PUBLICATIONS

European Patent Office, "Extended European Search Report from EP Application No. 15193083.1 dated Jun. 15, 2016", "from Foreign Counterpart of U.S. Appl. No. 14/593,266", filed Jun. 15, 2016, pp. 1-11, Published in: EP.

(Continued)

*Primary Examiner* — Redhwan K Mawari
*Assistant Examiner* — Rodney P. King
(74) *Attorney, Agent, or Firm* — Fogg & Powers LLC

(57) ABSTRACT

One embodiment is directed towards a method for determining a heading for a hybrid navigation system with magnetometer aiding. The method includes receiving signals from a plurality of GNSS satellites, obtaining three-dimensional inertial measurements from one or more inertial sensors, and obtaining three-dimensional magnetic measurements from one or more magnetometers. Magnetic bias states are estimated for the three-dimensional magnetic measurements with a magnetic calibration filter using the three-dimensional inertial measurements, data from the signals from the plurality of GNSS satellites, and the three-dimensional magnetic measurements. An artificial heading is calculated based on the magnetic bias states. A main navigation solution can be estimated with a main navigation filter using the three-dimensional inertial measurements, data from the signals from a plurality of GNSS satellites, and the artificial heading.

19 Claims, 3 Drawing Sheets

(51) Int. Cl.
*G01C 21/16* (2006.01)
*G01C 21/08* (2006.01)

(58) Field of Classification Search
USPC .......................................................... 701/472
See application file for complete search history.

(56) References Cited

U.S. PATENT DOCUMENTS

| | | |
|---|---|---|
| 8,014,948 B2 | 9/2011 | Vanderwerf |
| 2011/0068975 A1* | 3/2011 | Zietz ....................... G01S 19/35 342/357.36 |
| 2011/0153266 A1* | 6/2011 | Shankwitz ........... G01C 21/165 702/150 |
| 2012/0265440 A1 | 10/2012 | Morgan |
| 2013/0030700 A1* | 1/2013 | Miller .................... G01C 21/16 701/500 |
| 2014/0062765 A1 | 3/2014 | Brenner |
| 2014/0074397 A1 | 3/2014 | Vanderwerf |
| 2014/0292574 A1 | 10/2014 | Dunik et al. |

OTHER PUBLICATIONS

Kana et al., "Architectures for High Integrity Multi-Constellation Solution Separation", "Proceedings of the 27th International Technical Meeting of the ION Satellite Division, ION GNSS+ 2014", Sep. 8-12, 2014, pp. 3554-3565.
Escher et al., "GPS/IRS Hybridization: Definition of Exclusion Radius Using Solution Separation Method", Jun. 15, 2011, pp. 1-10.

\* cited by examiner

US 9,939,532 B2

HEADING FOR A HYBRID NAVIGATION SOLUTION BASED ON MAGNETICALLY CALIBRATED MEASUREMENTS

STATEMENT REGARDING FEDERALLY SPONSORED RESEARCH OR DEVELOPMENT

This invention was made with Government support under Government Contract #2013TA03030674 awarded by Technology Agency of Czech Republic. The Government has certain rights in the invention.

BACKGROUND

Navigation integrated systems based on low-cost inertial sensors (typically MEMS based) often use magnetometer aiding to estimate heading during non-accelerated flight phases. Since assuring the reliability of magnetic aiding is a challenging task, however, contemporary systems use the magnetometer measurements only when the aiding is necessary and only for heading, not pitch and roll. In order to assure that the magnetometer measurements are not used for pitch and roll, contemporary systems typically do not use three-dimensional magnetic vectors in the aiding.

SUMMARY

One embodiment is directed towards a method for determining a heading for a hybrid navigation system with magnetometer aiding. The method includes receiving signals from a plurality of global navigation satellite system (GNSS) satellites at a location corresponding to an object, obtaining three-dimensional inertial measurements from one or more inertial sensors corresponding to the object, and obtaining three-dimensional magnetic measurements from one or more magnetometers corresponding to the object. Magnetic bias states are estimated for the three-dimensional magnetic measurements with a magnetic calibration filter using the three-dimensional inertial measurements, data from the signals from the plurality of GNSS satellites, and the three-dimensional magnetic measurements. An artificial heading is calculated for the object using the magnetic bias states. A main navigation solution for the object can be estimated with a main navigation filter using the three-dimensional inertial measurements, data from the signals from a plurality of GNSS satellites, and the artificial heading.

DRAWINGS

The following exemplary figures are intended to aid the understanding of the written description of the exemplary embodiments and should not be considered limiting in scope.

In accordance with common practice, the various displayed features are not necessarily drawn to scale but are drawn to emphasize specific features relevant to the exemplary embodiments.

DETAILED DESCRIPTION

Lack of utilization of three-dimensional magnetic vector aiding prevents full on-line magnetometer calibration, which includes identification of both the magnetometer calibration parameters: the soft and hard iron biases. Such a magnetometer calibration can significantly improve the heading estimation accuracy, which often represents the bottle-neck of an integrated navigation system or attitude and heading reference system (AHRS) design because of stringent heading requirements.

Embodiments described herein provide a heading solution based on three-dimensional magnetometer measurements with a proper modeling and treating of the errors in the magnetometer measurements, while ensuring the three-dimensional magnetometer measurements do not affect the roll or pitch solutions. Embodiments described herein also provide a global navigation satellite system (GNSS) signal in space integrity for navigation parameters including the heading based on solution separation without a significant increase in computational demands.

Figure 1:
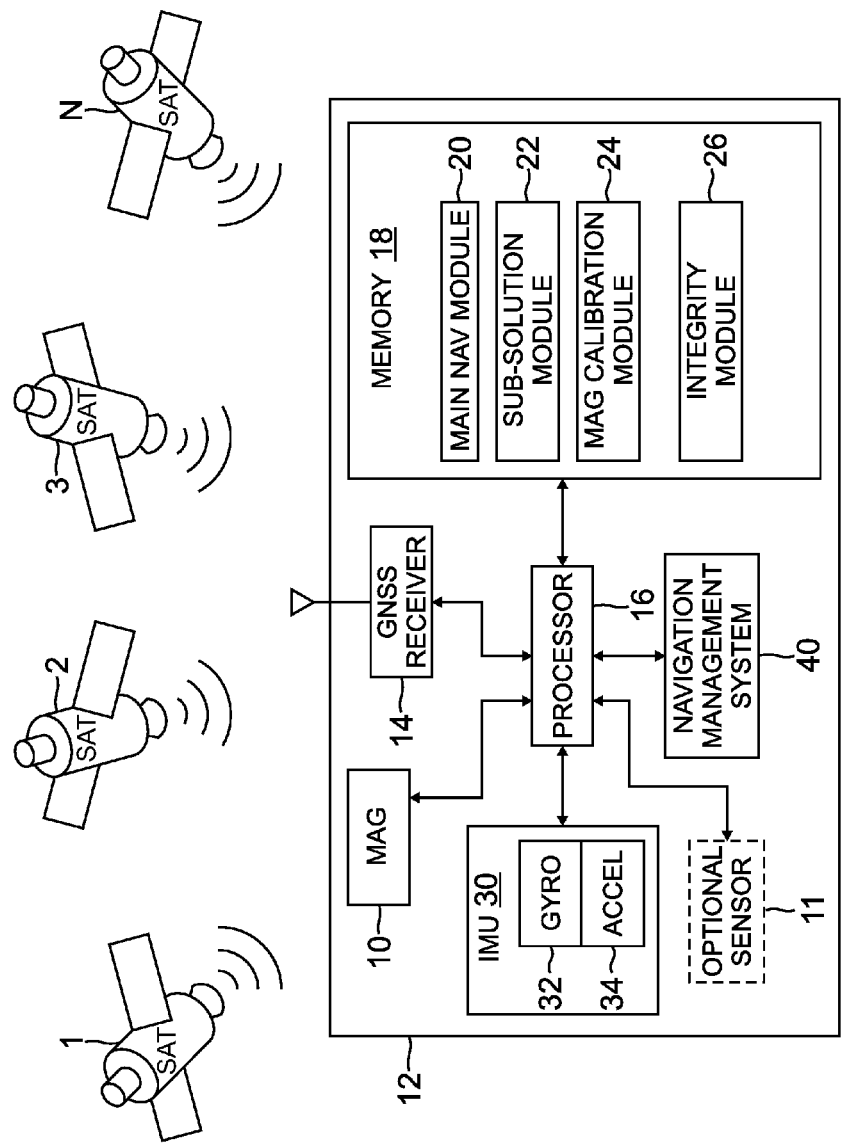
FIG. 1 is an exemplary embodiment of system including an object with a hybrid navigation system configured to provide a heading for the object based on magnetically calibrated measurements.

FIG. 1 depicts one exemplary embodiment of an object 12 with one or more inertial measurement units (IMUs) 30 including one or more gyroscopes 32 and accelerometers 34. Object 12 also includes one or more GNSS receivers 14 that receive signals from a number of satellites 1-N. Object 12 also includes one or more magnetometers 10. Object 12 can also optionally include one or more other sensors 11, such as one or more barometers. Object 12 further includes one or more processing devices 16 coupled to one or more memory units 18 that store instructions (e.g., software) as well as data received from the GNSS receiver(s) 14, the magnetometer(s) 10, the IMU(s) 30, and the optional other sensor(s) 11. The instructions, when executed on the processing device(s) 16, are configured to cause the processing device(s) 16 to determine a hybrid navigation solution for the object 12 based on the data from the GNSS receiver(s) 14, the magnetometer(s) 10, and IMU(s) 30. The instructions on the memory 18 can include a main navigation filter module 20, a sub-solution module 22, a magnetic calibration filter module 24, and a navigation solution integrity module 26 that are configured to implement their respective functions on the processing device(s) 16. It should be understood that the demarcation of the modules 20, 22, 24, 26 described herein is an example, and in other examples, more, fewer, and/or different modules can be used, and the actions assigned to a given module may be different. The object 12 can include any object for which it is desired to determine a navigation solution, such as a manned or unmanned vehicle (e.g., aircraft, boat, car).

A navigation solution determined by the processing device(s) 16 can be output to a navigation management system 40 that includes another processing device(s) to oversee navigation and provide commands to various units, for example, the sensor(s) 30, GNSS receiver(s) 14, and processing device(s) 16. For a manned aircraft, the navigation management system 40 could be a Flight Management System that communicates with a pilot and a ground control station through display monitors or printers. In another embodiment, processing device(s) 16 and the navigation management system 40 may be combined in a single unit. The navigation management system 40 can be implemented using any suitable processing device(s) and display technology such as, but not limited to, printers, computer screens, various CRT, active and passive matrix LCD, and plasma display units. The processing device(s) 16 and the processing device(s) in the navigation management system 40 may include any suitable processing device(s) such as a digital signal processing device (DSP), central processing unit (CPU), micro-controller, or arithmetic logic unit. Memory 18 may comprise any suitable storage entity such as a flash drive, magnetic-disk drive, RAM (e.g., DRAM), ROM, PROM, or CD/DVD/Blu-ray, optical storage or optoelectronics circuits.

The IMU(s) 30, GNSS receiver(s) 14, the magnetometer(s) 10, and the optional other sensor(s) 11 can all be physically attached to the object 12, such that their measurements correspond to the object 12. Accordingly, the IMU(s) 30 can be configured to sense inertial movement of the object 12 about three mutually orthogonal axes to obtain three-dimensional inertial measurements corresponding to the object 12. The GNSS receiver(s) 14 can be configured to receive signals at the location of the object 12 from the GNSS satellites 1-N, and to provide pseudorange measurements to the processing device(s) 16 based on the received signals. Example GNSS satellite constellations include the global position system (GPS), GLONASS, Galileo, and Beidou constellations. The magnetometer(s) 10 can be configured to sense Earth's magnetic field in three mutually orthogonal directions at the location of the object 12 to obtain three-dimensional magnetic measurements corresponding to the object 12. The optional sensor(s) 11 include one or more barometers configured to sense a barometric pressure at the location of the object to obtain barometric measurements corresponding to the object.

Figure 2:
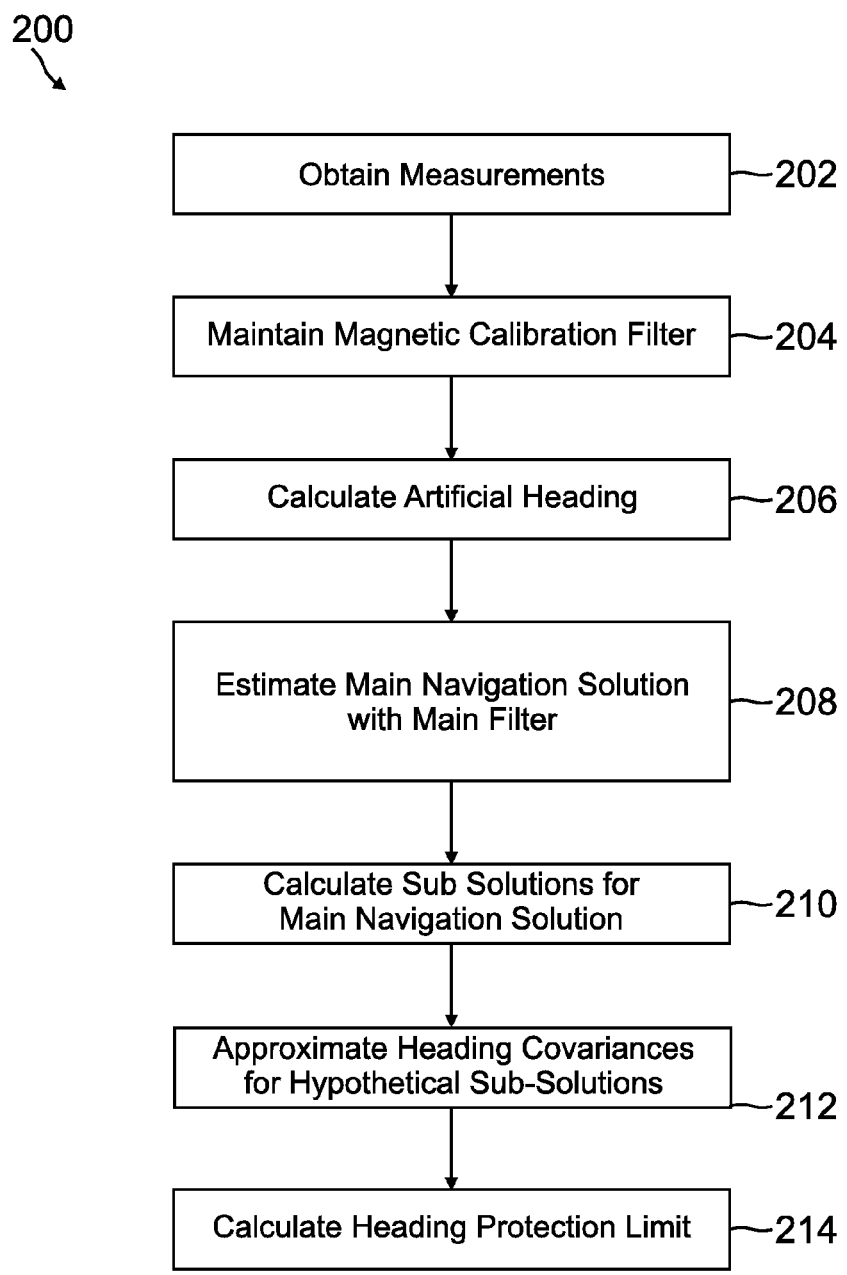
FIG. 2 is a flowchart of one embodiment of a method to determine the heading for the object of FIG. 1 and to determine a protection limit for the heading.

FIG. 2 illustrates one embodiment of a method 200 for determining a navigation solution using the system described with respect to FIG. 1. Signals from a plurality of GNSS satellites are received at the location of the object 12 by the GNSS receiver(s) 14. The GNSS receiver(s) 14 can then generate pseudorange measurements based on the received signals (block 202). Three-dimensional (3-D) inertial measurements corresponding to the object 12 are obtained with the IMU(s) 30 (block 202). 3-D magnetic measurements corresponding to the object 12 are obtained with the magnetometer(s) 10 (block 202). If any optional sensor(s) 11 (e.g., one or more barometers) are included, measurements corresponding to the object 12 (e.g., barometric measurements) can also be obtained. The pseudorange measurements, 3-D inertial measurements, 3-D magnetic measurements, and the measurements from the optional other sensor(s) 11 (e.g., barometric measurements), if present, are provided to the processing device(s) 16.

The processing device(s) 16 can execute the instructions on the memory 18 to perform the following actions based on the pseudorange measurements, 3-D inertial estimates, 3-D magnetic measurements, and barometric measurements (if present). The instructions on the memory 18 include magnetic calibration filter module 24, which cause the processing device(s) 16 to maintain a magnetic calibration filter (block 204) as described below based on the pseudorange measurements, 3-D inertial measurements, 3-D magnetic measurements and the measurements from the optional sensor(s) 11 (if present).

Figure 3:
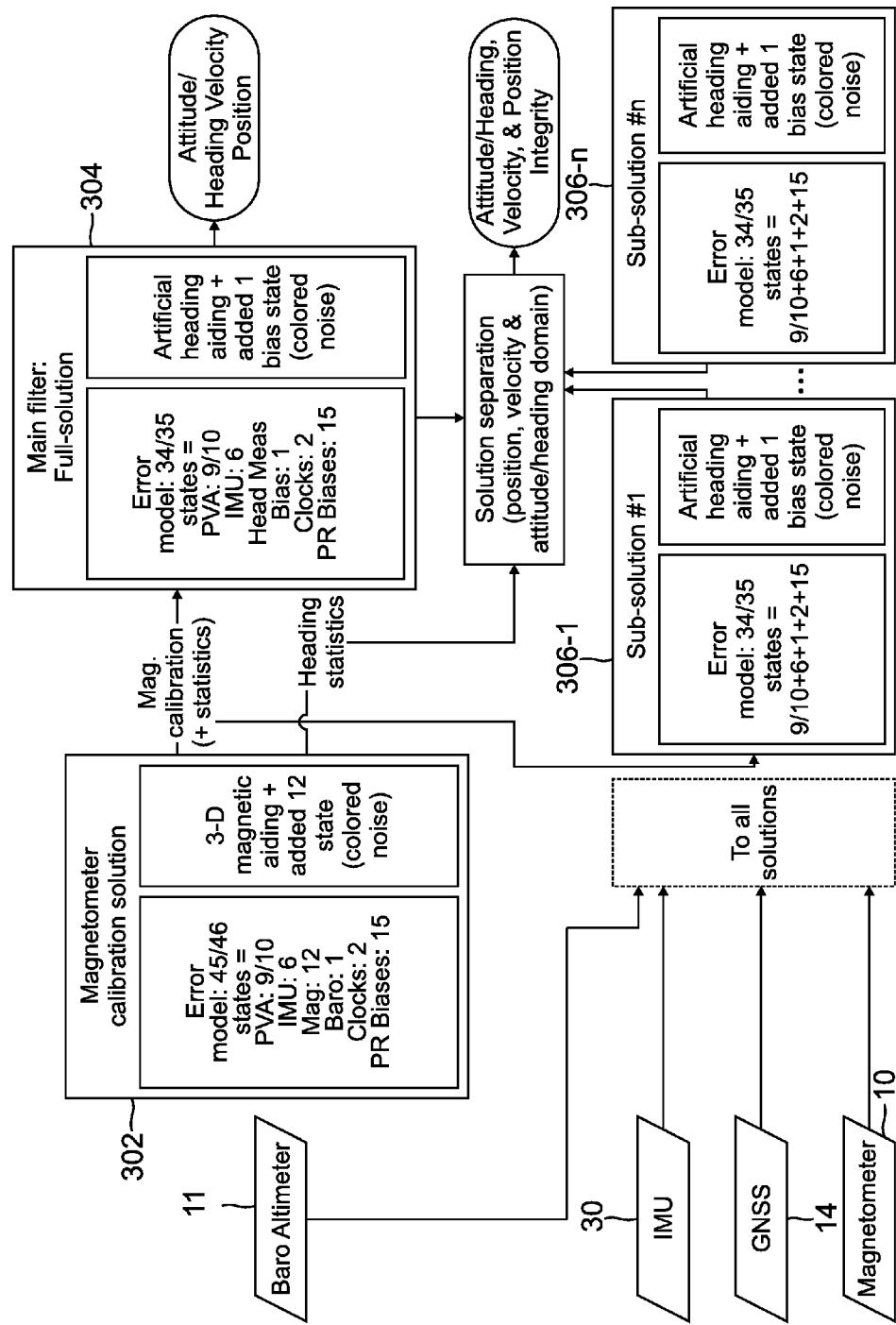
FIG. 3 is an exemplary embodiment of a plurality of filters maintained in order to determine a navigation solution including the heading as well as corresponding protection limits including the heading protection limit using the method of FIG. 2.

FIG. 3 is a block diagram illustrating the magnetic calibration filter 302, other filters implemented by the processing device(s) 16, and the interaction amongst the filters and with the IMU(s) 30, GNSS receiver(s) 14, magnetometer(s) 10, and optional sensor 11 (e.g., a barometer). The magnetic calibration filter 302 (also referred to herein as simply "calibration filter 302") is configured to estimate components of a state vector corresponding to the object 12 and can be based on an estimation algorithm following the Kalman filter design approach. The state vector components can include states for position, velocity, roll, pitch, and heading of the object 12. In an example, these states include nine or ten states for 3-D position and velocity as well as roll, pitch, and heading of the object 12. The state vector components can include states for calibration of the 3-D inertial measurements. In an example, these states include six states for calibration of 3-D acceleration and angular rate. The state vector components can include states for bias and drift of the clock(s) of the GNSS receiver(s) 14, and states for pseudorange biases of the signals received by the GNSS receiver(s) 14. In examples where barometric measurements are obtained (present), the calibration filter 302 can also estimate a state for bias of the barometric measurement. Manners of implementing all of these states are known to those skilled in the art.

The state vector components can also include states for bias of the 3-D magnetic measurements. In an example, the states for bias of the 3-D magnetic measurements include nine states for soft iron biases about the 3-D axes and three states for hard iron biases about the 3-D axes. Manners of implementing such states for bias of the 3-D magnetic measurements are known to those skilled in the art.

The calibration filter 302 operates recursively to iteratively update the state vector based on updated inertial measurements, pseudorange measurements, magnetic measurements, and barometric measurements (if present). In an example, the calibration filter 302 can use the inertial measurements for a prediction step, and the pseudorange measurements, the magnetic measurements, and the barometric measurements (if present) to update the state vector from the prediction step in the filtering step.

Based on the magnetic bias states maintained by the calibration filter 302, an "artificial heading" is generated (block 206 of FIG. 2) for aiding of a main navigation filter 304 (also referred to herein as simply "main filter 304"). The term artificial heading is defined for the sake of simplicity as this heading calculation aids the main filter 304 with a magnetic measurement that is calibrated and is limited to heading only; the magnetic measurement does not affect pitch or roll. In an example the artificial heading can be a magnetic measurement that is calibrated for hard and soft iron bias and compensated for declination and inclination. Based on the artificial heading the main filter 304 can estimate a main navigation solution including a heading, pitch, and roll with the benefit of calibrated magnetic measurements for the heading, and while ensuring that the pitch and roll are unaffected by the magnetic measurements.

In addition to the magnetic bias states, the artificial heading is based on the 3-D magnetic measurements, roll and pitch estimates of the object from the main filter 304, and a magnetic declination based on a position estimate of the object from the main filter 304. In particular, the artificial heading uses the biases given by the magnetic bias states from the calibration filter 302 and adjusts the magnetic measurements from the magnetometer(s) 10 based thereon to calibrate the magnetic measurements. Since the calibration filter 304 takes in 3-D magnetic measurements and estimates 3-D hard iron biases and 3-D soft iron biases, the magnetic measurements can be fully calibrated. In an example, the calbirated magnetic measurements, $m_{cal}^B$, are calculated according to:

$$m_{cal}^B = (D_{mag})^{-1}(\tilde{m}^B) - b_{mag}^B$$

where $D_{mag}$ is the magnetic bias state matrix corresponding to nine soft iron biases, $b_{mag}^B$ is the magnetic bias state vector corresponding to hard iron biases, and $\tilde{m}^B$ is the 3-D magnetic measurements. In this example, the calibrated magnetic measurements are calculated in the body frame of the object 12, as denoted above by the superscript 'B'.

In addition to calibrating the measurements, the calculation to determine the artificial heading reduces the 3-D magnetic measurements down to a one-dimensional heading only value, thus removing any magnetic measurements about the pitch and roll axis. Accordingly, the calibrated magnetic measurements can then be transformed based on the roll and pitch estimates from the main filter 304 and the magnetic declination at the position estimated by the main filter 304 to arrive at the artificial heading. In an example, this transformation calculates the artificial heading, $\psi_{ma}$, as $$\psi_{ma} = \operatorname{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}$$

where $\phi$ is the roll estimate from the main navigation filter 304, $\theta$ is the pitch estimate from the main navigation filter 304, $\psi_{dec}$ is the magnetic declination, and $m_{cal}^{Bx}$, $m_{cal}^{By}$, and $m_{cal}^{Bz}$ are calibrated magnetic measurements with components x, y, and z the body frame, respectively. In an example, the main filter module 20 is configured to cause the processing device(s) 16 to calculate the artificial heading, but in other examples other modules can cause the calculation.

Once calculated, the artificial heading is processed by the main filter 304 as a measurement. Similar to the calibration filter 302, the main filter 304 can use the 3-D inertial measurements for a prediction step. Instead of using the 3-D magnetic measurements as the calibration filter 302 does, however, the main filter 304 uses the artificial heading along with the pseudorange measurements and (if present) measurements from the optional other sensor(s) 11 (e.g., barometer) to update the prediction step in the filtering step.

The main filter module 20 is configured to cause the processing device(s) 16 to model the error in the artificial heading, $\psi_{ma}$, as time correlated heading bias error, $b_{\psi,ma}$, plus uncorrelated ("white") noise, $w_{ma}$. The time correlated heading bias error, $b_{\psi,ma}$, is modeled as a state in the state space of the main filter 304. The main filter 304 uses statistics from the calibration filter 302 to estimate the state for time correlated bias. In particular, the statistics of time correlated bias can be calculated based on the statistics of magnetic bias state estimates from the calibration filter 302 and a magnetic declination error effect at a position of the object estimated by the main filter 304. In an example, these statistics can be transformed on the bias statistics with the usage of first order Taylor series expansion. In an example, the time correlated bias states is modeled as a first order Gauss-Markov (GM) process as $$\delta b_{\psi,ma} = -\frac{1}{\tau_{\psi,ma}} \delta b_{\psi,ma} + w_{GM,ma}$$

where $b_\psi$ is the time correlated bias, $\tau_\psi$ is the time constant of the GM process, and $w_{GM}$ is uncorrelated white noise driving the GM process. The subscript 'ma' denotes that the respective value is from/part of the main filter 304. The stationary (steady state) variance of the GM process is denoted as $(\sigma_{GM,ma})^2 = \operatorname{Var}(b_{\psi,ma})$, where sigma is the standard deviation.

For the uncorrelated noise of the artificial heading, the variance of the uncorrelated noise, $\sigma_{WN}$, can be given by the magnetometer measurement noise and statistics of attitude error effect on the artificial heading. Accordingly, the main filter 304 can calculate the uncorrelated noise, $\sigma_{WN}$, as $(\sigma_{WN,ma})^2 = \operatorname{Var}(w_{ma})$. In an example, these statistics can be transformed on the uncorrelated noise statistics with the usage of first order Taylor series expansion.

In addition to the time correlated bias state, the main filter module 20 is configured to cause the processing device(s) 16 to estimate a main navigation solution for the object 12 (block 208 of FIG. 2). In an example, the main filter 304 estimating the main navigation solution includes estimating states for position, velocity, roll, pitch, and heading of the object 12. In an implementation, these states include nine or ten states for 3-D position and velocity as well as roll, pitch, and heading of the object 12. Estimating the main navigation solution can also include estimating states for calibration of the 3-D inertial measurements. In an example, these states include six states for calibration of 3-D acceleration and angular rate. The main filter 304 can also estimate states for bias and drift of the clock(s) of the GNSS receiver(s) 14, a state for barometer bias (if a barometer is present), and states for pseudorange biases for the signals received by the GNSS receiver(s) 14. The main filter 304 operates recursively to iteratively update the states based on updated inertial measurements, pseudorange measurements, barometric measurements (if present), and artificial heading, and can be based on an estimation algorithm following the Kalman filter design approach.

Once the main navigation solution is calculated, the main navigation solution can be output to a navigation management system 40, which can take appropriate action such as controlling operation of the object 12 based on the main navigation solution.

The system of FIG. 1 can also be configured to provide integrity on the main navigation solution. This integrity can be provided using a solution separation technique. Solution separation techniques involve maintaining a plurality of sub-solutions for the main navigation solution by a plurality of sub-filters 306-1 through 306-N (block 210 of FIG. 2). A separate sub-solution is maintained for each set of N−1 satellites, where the main navigation solution incorporates measurements from all N satellites. Thus, each sub-solution incorporates measurements from a different combination of N−1 satellites. That is, sub-filter 306-n excludes measurements from satellite n. If a satellite has large errors, it will drive one or more of the sub-solutions away from the main navigation solution maintained by the main filter 304. More specifically, there are solution differences (also referred to herein as "separations") between the main navigation solution of the main filter 304 and each sub-solution of each sub-filter 306.

The sub-solution module 22 is configured to cause the processing device(s) 16 to calculate such sub-solutions for the main navigation solution. In an example, each sub-filter 306 estimates generally the same state vector as the main filter 304. That is, the meaning of the state variables between the sub-solutions and the main solution are the same; however, the state vectors of some of the sub-solutions might be of a different dimension than the state vector of the main solution. Since a sub-solution processes N−1 measurements, there will be just N−1 pseudorange biases estimated (in contrast to the N biases in the main filter). Generally, however, in examples where the main filter estimates states for 3-D position, 3-D velocity, roll, pitch, and heading, the sub-solutions can estimate states for the same. The sub-filters 306 also estimate the states for calibration of the 3-D inertial measurements, bias and drift of the clock(s) of the GNSS receiver(s) 14, a state for barometer bias (if a barometer is present), and pseudorange biases for the signals received by the GNSS receiver(s) 14. Each sub-filter 306 can also estimate a state for time correlated bias of the artificial heading.

Similar to the main filter 304, the sub-filters 306 can estimate these states based on the 3-D inertial measurements, the pseudorange measurements from the GNSS receiver(s) 14, and an artificial heading based on the calculations analogous to those used in the calibration filter 302. In an example, the same artificial heading that was used for the main filter 304 can be used for each of the sub-filters 306. In an alternative example, the artificial heading used by each sub-filter can be based on the roll and pitch estimates from the respective sub-filter 306 and the magnetic declination at the position estimated by that respective sub-filter 306. Accordingly, each sub-filter can use an independent artificial heading that is calculated by transforming the calibration magnetic measurements based on the roll, pitch, and position of the respective sub-filter.

The navigation solution integrity module 26 is configured to cause the processing device(s) 16 to determine protection limits based on the main navigation solution and the sub-solutions. Manners of determining a protection limit (the integrity) from the state vectors maintained by the main filter 304 and sub-filters 306 for navigation values other than heading are known to those skilled in the art based on the separations between the main navigation solution and each respective sub-solution for the respective navigation values.

Since the main filter 304 and the sub-filters 306 do not model the leveling correlations on the roll and pitch estimates, however, a heading protection limit based on the separations of the headings between the main filter 304 and each respective sub-filter 306 may be too optimistic. Accordingly, the heading protection limit is calculated based on the heading estimate from the calibration filter 302. In an example, however, sub-solutions of the heading estimate from the calibration filter are not calculated in order to reduce the amount of computation required. Instead, covariances for hypothetical sub-solution heading estimates of the calibration filter 302 are approximated (block 212 of FIG. 2).

The covariances for hypothetical sub-solution heading estimates (also referred to herein as "sub-solution heading covariances") of the calibration filter 302 can be approximated based on the ratio of heading covariances of the main filter 304, each of its respective sub-filters 306, and the calibration filter 302. In particular, it can be assumed that the ratio between the heading covariance of the calibration filter 302 and the heading covariance of a respective ('n') hypothetical sub-filter for the calibration filter 302 is approximately equal to the ratio between the heading covariance of the main filter 304 and the heading covariance of its corresponding 'n' sub-filter 306. This relationship is shown in the equation:

$$\frac{Cov(\psi)_{0,DMHA}}{Cov(\psi)_{0,3-D}} \approx \frac{Cov(\psi)_{n,DMHA}}{Cov(\psi)_{n,3-D}} \Leftrightarrow \frac{Cov(\psi)_{n,3-D}}{Cov(\psi)_{0,3-D}} \approx \frac{Cov(\psi)_{n,DMHA}}{Cov(\psi)_{0,DMHA}}$$

This relationship can be assumed for each of the hypothetical sub-filters (1-N) of the calibration filter 302. Using this relationship, a plurality of N sub-solution heading covariances for the calibration filter 302 can be determined. In an example, an overbounding factor, $\gamma_{ovrb}$, is used to make sure the approximation of each sub-solution heading covariance for the calibration filter 302 is not too optimistic. In such an example, each sub-solution heading covariance for the calibration filter 302 can be calculated according to $$Cov(\psi)_{n,3-D} \approx (\gamma_{ovrb})^2 \frac{Cov(\psi)_{0,3-D}}{Cov(\psi)_{0,DMHA}} Cov(\psi)_{n,DMHA}$$

where $Cov(\psi)_{n,3-D}$ is the sub-solution heading covariance for the hypothetical sub-solution 'n' of the calibration filter 302, $\gamma_{ovrb}$ is the overbounding factor that is greater than or equal to 1, $Cov(\psi)_{0,3-D}$ is the heading covariance of the calibration filter 302, $Cov(\psi)_{0,DMHA}$ is the heading covariance of the main filter 304, and $Cov(\psi)_{n,DMHA}$ is the heading covariance of sub-solution 'n' from the sub-filters 306 of the main filter 304. Notably, sub-solution 'n' of the main filter 304 and the hypothetical sub-solution 'n' of the calibration filter 302 both correspond to the same set of N−1 satellites.

Once the heading covariances for all the hypothetical sub-solutions are determined, the heading (Yaw) protection limit (YPL) can be calculated as follows (block 214 of FIG. 2):

$$YPL = \max\left(YPL_{H0}, \max_n (D_{\psi,n} + a_{\psi,n})\right)$$

where $$YPL_{H0} = K_{ff} \sqrt{Cov(\psi)_{0,DMHA}}$$

and $$D_{\psi,n} = K_{fa} \sqrt{(\gamma_{ovrb})^2 \frac{Cov(\psi)_{0,3-D}}{Cov(\psi)_{0,DMHA}} Cov(\psi)_{n,DMHA} - Cov(\psi)_{0,3-D}}$$

and $$a_{\psi,n} = K_{md} \gamma_{ovrb} \sqrt{\frac{Cov(\psi)_{0,3-D}}{Cov(\psi)_{0,DMHA}} Cov(\psi)_{n,DMHA}}$$

and $K_{ff}$, $K_{fa}$, and $K_{md}$ are the so-called sigma multipliers known to those skilled in the art.

The heading protection limit along with protection limits for the other navigation values can be provided to the navigation management system 40. The navigation management system 40 can then take appropriate action such as initiating an alarm if a protection limit is out of range.

Advantageously, this method can be used to provide integrity for the magnetically aided heading solution with only one additional filter (the magnetic calibration filter 302) more than a conventional solution separation implementation. This means that the above methods can be implemented with N+2 filters if fault detection, but not exclusion is implemented, where N represent the number of processes pseudorange measurements. Additionally, the above methods represent suitable navigation solutions for all navigation systems using low-cost inertial sensor (typically MEMS based) aided by GNSS and magnetometer. Such systems can, for example, be referred to as GPS/INS, GNSS/INS, GPS/AHRS, GNSS/AHRS, and GPAHRS. Additionally, the subject matter described herein can be used in the advanced receiver monitoring integrity method (ARAIM) or any other method based on the solution separation, such as a solution separation method where N represents a number of fault states to be mitigated, rather than the number of pseudorange measurements.

In an example, the one or more GNSS receivers 14 include multiple GNSS antennas to receive GNSS signal and can provide calculated values for the attitude and heading of the aircraft using GNSS interferometry. GNSS errors contribute directly to the sources of errors for attitude and heading. In some implementations of such an example, the GNSS receiver(s) 14 can compute a snapshot least squares solution using only the multiple GNSS measurements. In other implementations, a hybrid solution can be calculated by processing the GNSS-derived attitude and heading solutions as measurements to the filter. In such implementations, the above solution separation and Kalman filter techniques are applicable to multiple antennas and sets of data in determining the errors in the estimates of attitude and heading.

Although the above description is focused on fault detection only, the subject matter described herein can be extended to include fault detection and exclusion in a straightforward manner by adding a sub-sub-solution filter layer as understood by those skilled in the art.

Although the solution separation technique discussed above corresponds to GNSS; and the same technique can be carried over to the multiple sets of data from other instruments. For example, there may be multiple sets of instruments, such as IMUs, mounted to the object 12 and a solution separation technique can be performed on the sets of data from other instruments before being combined with the data from GNSS.

EXAMPLE EMBODIMENTS

Example 1 includes a method for determining a heading for a hybrid navigation system with magnetometer aiding, the method comprising: receiving signals from a plurality of global navigation satellite system (GNSS) satellites corresponding to an object; obtaining three-dimensional inertial measurements from one or more inertial sensors corresponding to the object; obtaining three-dimensional magnetic measurements from one or more magnetometers corresponding to the object; estimating magnetic bias states for biases of the three-dimensional magnetic measurements with a magnetic calibration filter using the three-dimensional inertial measurements, data from the signals from the plurality of GNSS satellites, and the three-dimensional magnetic measurements; calculating an artificial heading for the object based on the magnetic bias states; and estimating a main navigation solution for the object with a main navigation filter using the three-dimensional inertial measurements, data from the signals from a plurality of GNSS satellites, and the artificial heading.

Example 2 includes the method of Example 1, wherein estimating magnetic bias states includes estimating nine states for soft iron biases and three states for hard iron biases.

Example 3 includes the method of any of Examples 1-2, comprising: estimating states for position, velocity, roll, pitch, and heading of the object with the magnetic calibration filter; estimating states for calibration of the three-dimensional inertial measurements with the magnetic calibration filter; estimating states for bias and drift of a GNSS clock with the magnetic calibration filter; and estimating states for pseudorange biases for the signals from the GNSS satellites with the magnetic calibration filter.

Example 4 includes the method of any of Examples 1-3, comprising: obtaining barometric measurements corresponding to the object; estimating a state for bias of the barometric measurements with the magnetic calibration filter; and estimating a state for bias of the barometric measurements with the main navigation filter.

Example 5 includes the method of any of Examples 1-4, wherein calculating an artificial heading includes calculating the artificial heading based on the magnetic bias states, the three-dimensional magnetic measurements, roll and pitch estimates of the object from the main navigation filter, and a magnetic declination based on a position estimate of the object from the main navigation filter.

Example 6 includes the method of any of Examples 1-5, wherein calculating the artificial heading includes calculating the artificial heading, $\psi_{ma}$, as $$\psi_{ma} = \operatorname{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}$$

where $\varphi$ is the roll estimate from the main navigation filter, $\theta$ is the pitch estimate from the main navigation filter, $\psi_{dec}$ is the magnetic declination, and $m_{cal}^{Bx}$, $m_{cal}^{By}$, and $m_{cal}^{Bz}$ are calibrated magnetic measurements with components x, y, and z in the body frame, respectively.

Example 7 includes the method of Example 6, wherein $m_{cal}^B$ is calculated as $$m_{cal}^B = (D_{mag})^{-1}(\tilde{m}^B) - b_{mag}^B$$

where $D_{mag}$ is the magnetic bias state matrix corresponding to soft iron biases, $b_{mag}^B$ is the magnetic bias state vector corresponding to hard iron biases, and $\tilde{m}^B$ is the three-dimensional magnetic measurements.

Example 8 includes the method of any of Examples 1-7, comprising: estimating a time correlated bias of the artificial heading with the main navigation filter.

Example 9 includes the method of Example 8, wherein estimating the time correlated bias includes estimating the time correlated bias based on statistics of the magnetic bias states and magnetic declination statistics based on position estimate statistics of the object from the main navigation filter.

Example 10 includes the method of any of Examples 8 or 9, comprising: estimating states for calibration of the three-dimensional inertial measurements with the main navigation filter; estimating states for bias and drift of a GNSS clock with the main navigation filter; and estimating states for pseudorange biases for the signals from the GNSS satellites with the main navigation filter, wherein estimating a main navigation solution includes estimating states for position, velocity, roll, pitch, and heading of the object.

Example 11 includes the method of any of Examples 1-10, comprising: estimating an uncorrelated noise of the artificial heading based on magnetometer measurement noise statistics and statistics of attitude error effect on the artificial heading.

Example 12 includes the method of any of Examples 1-11, comprising: estimating a plurality of sub-solutions for the main navigation solution with a plurality of sub-filters using solution separation; calculating a heading covariance for each of the plurality of sub-solutions; calculating a heading covariance for the main navigation solution; calculating a heading covariance for the magnetic calibration filter; approximating a plurality of sub-solution heading covariances corresponding to the magnetic calibration filter based on the heading covariance for the main navigation solution, the heading covariance for each of the plurality of sub-solutions, and the heading covariance for the magnetic calibration filter; and determining a protection limit that bounds error in a heading of the main navigation solution based on respective separations between the heading covariance for the magnetic calibration filter and each of the sub-solution heading covariances corresponding to the magnetic calibration filter.

Example 13 includes the method of Example 12, wherein approximating the plurality of sub-solution heading covariances corresponding to the magnetic calibration filter includes approximating the n sub-solution heading covariance, $Cov(\psi)_{n,3-D}$, according to $$Cov(\psi)_{n,3-D} \approx (\gamma_{ovrb})^2 \frac{Cov(\psi)_{0,3-D}}{Cov(\psi)_{0,DMHA}} Cov(\psi)_{n,DMHA}$$

where $\gamma_{ovrb}$ is an overbounding factor that is greater than or equal to one, $Cov(\psi)_{0,3-D}$ is the heading covariance of the magnetic calibration filter, $Cov(\psi)_{0,DMHA}$ is the heading covariance of the main navigation filter, and $Cov(\psi)_{n,DMHA}$ is the heading covariance of the n sub-solution for the main navigation filter.

Example 14 includes a navigation system for an object comprising: one or more processing devices; one or more global navigation satellite system (GNSS) receivers coupled to the one or more processing devices; one or more inertial measurement units (IMUs) coupled to the one or more processing devices, the one or more IMUs configured to obtain three-dimensional inertial measurements corresponding to the object; one or more magnetometers coupled to the one or more processing devices, the one or more magnetometers configured to obtain three-dimensional magnetic measurements of the magnetic field at a location of the object; and one or more memory devices coupled to the one or more processing devices and including instructions which, when executed by the one or more processing devices, cause the one or more processing devices to: estimate magnetic bias states for biases of the three-dimensional magnetic measurements with a magnetic calibration filter using the three-dimensional inertial measurements for a prediction step, and using data from the one or more GNSS receivers and the three-dimensional magnetic measurements as a measurement vector; calculate an artificial heading for the object based on the magnetic bias states; and estimate a main navigation solution for the object with a main navigation filter using the three-dimensional inertial measurements for a prediction step, and using data from one or more GNSS receivers and the artificial heading as a measurement vector.

Example 15 includes the navigation system of Example 14, wherein estimate magnetic bias states includes estimate nine states for soft iron biases and three states for hard iron biases.

Example 16 includes the navigation system of any of Examples 14 or 15, wherein calculate the artificial heading includes calculate the artificial heading, $\psi_{ma}$, as $$\psi_{ma} = \operatorname{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}$$

where $\varphi$ is a roll estimate of the object from the main navigation filter, $\theta$ is a pitch estimate of the object from the main navigation filter, $\psi_{dec}$ is a magnetic declination based on a position estimate from the main navigation filter, and $m_{cal}^B$ is calculated as $$m_{cal}^B = (D_{mag})^{-1}(\tilde{m}^B) - b_{mag}^B,$$

where $D_{mag}$ is the magnetic bias state matrix corresponding to soft iron biases, $b_{mag}^B$ is the magnetic bias state vector corresponding to hard iron biases, and $\tilde{m}^B$ is the three-dimensional magnetic measurements.

Example 17 includes the navigation system of any of Examples 14-16, wherein the instructions cause the one or more processing devices to: estimate a time correlated bias of the artificial heading with the main navigation filter, based on statistics of the magnetic bias states and magnetic declination statistics based on position estimate statistics of the object from the main navigation filter; and estimate an uncorrelated noise of the artificial heading based on magnetometer measurement noise statistics and statistics of attitude error effect on the artificial heading.

Example 18 includes the navigation system of Example 17, wherein the instructions cause the one or more processing devices to: estimate states for calibration of the three-dimensional inertial measurements with the main navigation filter; estimate states for bias and drift of a GNSS clock with the main navigation filter; and estimate states for pseudorange biases for signals from GNSS satellites with the main navigation filter, wherein estimate a main navigation solution includes estimate states for position, velocity, roll, pitch, and heading of the object.

Example 19 includes the navigation system of any of Examples 14-18, wherein the instructions cause the one or more processing devices to: estimate a plurality of sub-solutions for the main navigation solution with a plurality of sub-filters using solution separation; calculate a heading covariance for each of the plurality of sub-solutions; calculate a heading covariance for the main navigation solution; calculate a heading covariance for the magnetic calibration filter; approximating a plurality of sub-solution heading covariances corresponding to the magnetic calibration filter based on a ratio between the heading covariance for the main navigation solution and the heading covariance for each of the plurality of sub-solutions being approximately equal to a ratio between the heading covariance for the magnetic calibration filter and each of the sub-solution heading covariances corresponding to the magnetic calibration filter; and determine a protection limit that bounds error in a heading of the main navigation solution based on respective separations between the heading covariance for the magnetic calibration filter and each of the sub-solution heading covariances corresponding to the magnetic calibration filter.

Example 20 includes a computer readable medium including instructions which, when executed by one or more processing devices, cause the one or more processing devices to: estimate magnetic bias states for biases of three-dimensional magnetic measurements with a magnetic calibration filter using three-dimensional inertial measurements for a prediction step, and using data from signals from a plurality of global navigation satellite system (GNSS) satellites and the three-dimensional magnetic measurements as a measurement vector, wherein estimate magnetic bias states includes estimate nine states for soft iron biases and three states for hard iron biases; calculate an artificial heading, $\psi_{ma}$, for the object as $$\psi_{ma} = \mathrm{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}$$

where $\varphi$ is a roll estimate of the object from the main navigation filter, $\theta$ is a pitch estimate of the object from the main navigation filter, $\psi_{dec}$ is a magnetic declination based on a position estimate from the main navigation filter, and $m_{cal}^B$ is calculated as $$m_{cal}^B = (D_{mag})^{-1}(\tilde{m}^B) - b_{mag}^B$$

where $D_{mag}$ is the magnetic bias state matrix corresponding to soft iron biases, $b_{mag}^B$ is the magnetic bias state vector corresponding to hard iron biases, and $\tilde{m}^B$ is the three-dimensional magnetic measurements; estimate statistics of time correlated bias of the artificial heading with the main navigation filter, based on statistics of the magnetic bias states and magnetic declination statistics based on position estimate statistics of the object from the main navigation filter; estimate uncorrelated noise statistics of the artificial heading based on magnetometer measurement noise statistics and statistics of attitude error effect on the artificial heading; estimate states for calibration of the three-dimensional inertial measurements with the main navigation filter; estimate states for bias and drift of a GNSS clock with the main navigation filter; and estimate states for pseudorange biases for the signals from the GNSS satellites with the main navigation filter, estimate states for position, velocity, roll, pitch, and heading of the object; estimate a plurality of sub-solutions for the main navigation solution with a plurality of sub-filters using solution separation; calculate a heading covariance for each of the plurality of sub-solutions; calculate a heading covariance for the main navigation solution; calculate a heading covariance for the magnetic calibration filter; approximate a plurality of sub-solution heading covariances corresponding to the magnetic calibration filter based on a ratio between the heading covariance for the main navigation solution and the heading covariance for each of the plurality of sub-solutions being approximately equal to a ratio between the heading covariance for the magnetic calibration filter and each of the sub-solution heading covariances corresponding to the magnetic calibration filter; and determine a protection limit that bounds error in the state for heading of the object based on respective separations between the heading covariance for the magnetic calibration filter and each of the sub-solution heading covariances corresponding to the magnetic calibration filter.

What is claimed is:

1. A method for determining a heading for a hybrid navigation system with magnetometer aiding, the method comprising:
   receiving signals from a plurality of global navigation satellite system (GNSS) satellites at a location corresponding to an object;
   obtaining three-dimensional inertial measurements from one or more inertial sensors corresponding to the object;
   obtaining three-dimensional magnetic measurements from one or more magnetometers corresponding to the object;
   estimating states for position, velocity, roll, pitch, and heading of the object with a magnetic calibration filter;
   estimating states for calibration of the three-dimensional inertial measurements with the magnetic calibration filter;
   estimating states for bias and drift of a GNSS clock with the magnetic calibration filter; and
   estimating states for pseudorange biases for the signals from the GNSS satellites with the magnetic calibration filter
   estimating nine soft iron bias states and three hard iron bias states for biases of the three-dimensional magnetic measurements with the magnetic calibration filter using the three-dimensional inertial measurements, data from the signals from the plurality of GNSS satellites, and the three-dimensional magnetic measurements;
   calculating an artificial heading for the object as a function of $$\psi_{ma} = f(\theta, \varphi, m_{cal}^{Bx}, m_{cal}^{By}, m_{cal}^{Bz}, \psi_{dec})$$

where $\varphi$ is the roll estimate from a main navigation filter, $\theta$ is the pitch estimate from the main navigation filter, $\psi_{dec}$ is the magnetic declination, and $m_{cal}^{Bx}$, $m_{cal}^{By}$, and $m_{cal}^{Bz}$ are calibrated magnetic measurements with components x, y, and z in the body frame, respectively, wherein $m_{cal}^B$ is calculated as a function of $$m_{cal}^B = f(D_{mag}, \tilde{m}^B, b_{mag}^B)$$

where $D_{mag}$ is the magnetic bias state matrix corresponding to soft iron biases, $b_{mag}^B$ is the magnetic bias state vector corresponding to hard iron biases, and $\tilde{m}^B$ is the three-dimensional magnetic measurements;
   estimating a main navigation solution for the object with the main navigation filter using the three-dimensional inertial measurements, data from the signals from a plurality of GNSS satellites, and the artificial heading.

2. The method of claim 1, wherein estimating magnetic bias states includes estimating nine states for soft iron biases and three states for hard iron biases.

3. The method of claim 1, comprising:
   obtaining barometric measurements corresponding to the object;
   estimating a state for bias of the barometric measurements with the magnetic calibration filter; and
   estimating a state for bias of the barometric measurements with the main navigation filter.

4. The method of claim 1, wherein calculating an artificial heading includes calculating the artificial heading based on the magnetic bias states, the three-dimensional magnetic measurements, roll and pitch estimates of the object from the main navigation filter, and a magnetic declination based on a position estimate of the object from the main navigation filter.

5. The method of claim 4, wherein calculating the artificial heading includes calculating the artificial heading, $\psi_{ma}$, as $$\psi_{ma} = \mathrm{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}.$$

6. The method of claim 5, wherein $m_{cal}^B$ is calculated as $$m_{cal}^B = (D_{mag})^{-1}(\tilde{m}^B) - b_{mag}^B.$$

7. The method of claim 1, comprising:
   estimating a time correlated bias error of the artificial heading with the main navigation filter.

8. The method of claim 7, wherein estimating the time correlated bias error includes estimating the time correlated bias error with the main navigation filter and its statistics being approximated based on statistics of the magnetic bias states of the object from the magnetic calibration filter and magnetic declination statistics based on position estimate statistics of the object from the main navigation filter.

9. The method of claim 7, comprising:
estimating states for calibration of the three-dimensional inertial measurements with the main navigation filter;
estimating states for bias and drift of a GNSS clock with the main navigation filter; and
estimating states for pseudorange biases for the signals from the GNSS satellites with the main navigation filter,
wherein estimating a main navigation solution includes estimating states for position, velocity, roll, pitch, and heading of the object.

10. The method of claim 1, comprising:
estimating uncorrelated noise statistics of the artificial heading based on magnetometer measurement noise statistics and statistics of attitude error effect on the artificial heading.

11. The method of claim 1, comprising:
estimating a plurality of sub-solutions for the main navigation solution with a plurality of sub-filters using solution separation;
calculating a heading covariance for each of the plurality of sub-solutions;
calculating a heading covariance for the main navigation solution;
calculating a heading covariance for the magnetic calibration filter;
approximating a plurality of sub-solution heading covariances corresponding to the magnetic calibration filter based on the heading covariance for the main navigation solution, the heading covariance for each of the plurality of sub-solutions, and the heading covariance for the magnetic calibration filter; and
determining a protection limit that bounds error in a heading of the main navigation solution based on respective separations between the heading covariance for the magnetic calibration filter and each of the sub-solution heading covariances corresponding to the magnetic calibration filter.

12. The method of claim 11, wherein approximating the plurality of sub-solution heading covariances corresponding to the magnetic calibration filter includes approximating the n sub-solution heading covariance, $Cov(\psi)_{n,3-D}$, according to $$Cov(\psi)_{n,3-D} \approx (\gamma_{ovrb})^2 \frac{Cov(\psi)_{0,3-D}}{Cov(\psi)_{0,DMHA}} Cov(\psi)_{n,DMHA}$$

where $\gamma_{ovrb}$ is an overbounding factor that is greater than or equal to one, $Cov(\psi)_{0,3-D}$ is the heading covariance of the magnetic calibration filter, $Cov(\psi)_{0,DMHA}$ is the heading covariance of the main navigation filter, and $Cov(\psi)_{n,DMHA}$ is the heading covariance of the n sub-solution for the main navigation filter.

13. A navigation system for an object comprising:
one or more processing devices;
one or more global navigation satellite system (GNSS) receivers coupled to the one or more processing devices, the one or more GNSS receivers configured to obtain pseudorange measurements corresponding to a location of the object;
one or more inertial measurement units (IMUs) coupled to the one or more processing devices, the one or more IMUs configured to obtain three-dimensional inertial measurements corresponding to the object;
one or more magnetometers coupled to the one or more processing devices, the one or more magnetometers configured to obtain three-dimensional magnetic measurements of the magnetic field at a location of the object; and
one or more memory devices coupled to the one or more processing devices and including instructions which, when executed by the one or more processing devices, cause the one or more processing devices to:
estimate states for position, velocity, roll, pitch, and heading of the object with a magnetic calibration filter;
estimate states for calibration of the three-dimensional inertial measurements with the magnetic calibration filter;
estimate states for calibration of a GNSS clock with the magnetic calibration filter; and
estimate states for pseudorange biases for the signals from the GNSS satellites with the magnetic calibration filter;
estimate nine soft iron bias states and three hard iron bias states for biases of the three-dimensional magnetic measurements with the magnetic calibration filter using the three-dimensional inertial measurements for a prediction step, and using data from the one or more GNSS receivers and the three-dimensional magnetic measurements as a measurement vector;
calculate an artificial heading for the object as a function of $$\psi_{ma} = f(\theta, \varphi, m_{cal}^{Bx}, m_{cal}^{By}, m_{cal}^{Bz}, \psi_{dec})$$

where $\varphi$ is the roll estimate from a main navigation filter, $\theta$ is the pitch estimate from the main navigation filter, $\psi_{dec}$ is the magnetic declination, and $m_{cal}^{Bx}$, $m_{cal}^{By}$, and $m_{cal}^{Bz}$ are calibrated magnetic measurements with components x, y, and z in the body frame, respectively, wherein $m_{cal}^B$ is calculated as a function of $$m_{cal}^B = f(D_{mag}, \tilde{m}^B, b_{mag}^B)$$

where $D_{mag}$ is the magnetic bias state matrix corresponding to soft iron biases, $b_{mag}^B$ is the magnetic bias state vector corresponding to hard iron biases, and $\tilde{m}^B$ is the three-dimensional magnetic measurements; and
estimate a main navigation solution for the object with the main navigation filter using the three-dimensional inertial measurements for a prediction step, and using data from the one or more GNSS receivers and the artificial heading as a measurement vector.

14. The navigation system of claim 13, wherein estimate magnetic bias states includes estimate nine states for soft iron biases and three states for hard iron biases.

15. The navigation system of claim 14, wherein calculate the artificial heading includes calculate the artificial heading, $\psi_{ma}$, as $$\psi_{ma} = \operatorname{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}$$

and $m_{cal}^B$ is calculated as $$m_{cal}^B = (D_{mag})^{-1}(\tilde{m}^B) - b_{mag}^B.$$

16. The navigation system of claim 13, wherein the instructions cause the one or more processing devices to:
  estimate a time correlated bias of the artificial heading with the main navigation filter, based on statistics of the magnetic bias states and magnetic declination statistics based on position estimate statistics of the object from the main navigation filter and
  estimate an uncorrelated noise of the artificial heading based on magnetometer measurement noise statistics and statistics of attitude error effect on the artificial heading.

17. The navigation system of claim 16, wherein the instructions cause the one or more processing devices to:
  estimate states for calibration of the three-dimensional inertial measurements with the main navigation filter;
  estimate states for bias and drift of a GNSS clock with the main navigation filter; and
  estimate states for pseudorange biases of signals from GNSS satellites with the main navigation filter,
  wherein estimate a main navigation solution includes estimate states for position, velocity, roll, pitch, and heading of the object.

18. The navigation system of claim 13, wherein the instructions cause the one or more processing devices to:
  estimate a plurality of sub-solutions for the main navigation solution with a plurality of sub-filters using solution separation;
  calculate a heading covariance for each of the plurality of sub-solutions;
  calculate a heading covariance for the main navigation solution;
  calculate a heading covariance for the magnetic calibration filter;
  approximating a plurality of sub-solution heading covariances corresponding to the magnetic calibration filter based on a ratio between the heading covariance for the main navigation solution and the heading covariance for each of the plurality of sub-solutions being approximately equal to a ratio between the heading covariance for the magnetic calibration filter and each of the sub-solution heading covariances corresponding to the magnetic calibration filter; and
  determine a protection limit that bounds error in a heading of the main navigation solution based on respective separations between the heading covariance for the magnetic calibration filter and each of the sub-solution heading covariances corresponding to the magnetic calibration filter.

19. A computer readable medium including instructions which, when executed by one or more processing devices, cause the one or more processing devices to:
  estimate magnetic bias states for biases of three-dimensional magnetic measurements with a magnetic calibration filter using three-dimensional inertial measurements for a prediction step, and using data from signals from a plurality of global navigation satellite system (GNSS) satellites and the three-dimensional magnetic measurements as a measurement vector, wherein estimate magnetic bias states includes estimate nine states for soft iron biases and three states for hard iron biases;
  calculate an artificial heading, $\psi_{ma}$, for an object as $$\psi_{ma} = \operatorname{atan} \frac{-m_{cal}^{Bz}\sin\phi + m_{cal}^{By}\cos\phi}{m_{cal}^{Bx}\cos\theta + m_{cal}^{By}\sin\theta\sin\phi + m_{cal}^{Bz}\sin\theta\cos\phi} - \psi_{dec}$$

where $\varphi$ is a roll estimate of the object from a main navigation filter, $\theta$ is a pitch estimate of the object from the main navigation filter, $\psi_{dec}$ is a magnetic declination based on a position estimate from the main navigation filter, and $m_{cal}^B$ is calculated as $$m_{cal}^B = (D_{mag})^{-1}(\tilde{m}^B) - b_{mag}^B$$

where $D_{mag}$ is the magnetic bias state matrix corresponding to soft iron biases, $b_{mag}^B$ is the magnetic bias state vector corresponding to hard iron biases, and $\tilde{m}^B$ is the three-dimensional magnetic measurements;
  estimate a time correlated bias of the artificial heading with the main navigation filter, based on statistics of the magnetic bias states and magnetic declination statistics based on position estimate statistics of the object from the main navigation filter;
  estimate an uncorrelated noise of the artificial heading based on magnetometer measurement noise statistics and statistics of attitude error effect on the artificial heading;
  estimate states for calibration of the three-dimensional inertial measurements with the main navigation filter;
  estimate states for bias and drift of a GNSS clock with the main navigation filter; and
  estimate states for pseudorange biases of the signals from the GNSS satellites with the main navigation filter,
  estimate states for position, velocity, roll, pitch, and heading of the object;
  estimate a plurality of sub-solutions for the main navigation solution with a plurality of sub-filters using solution separation;
  calculate a heading covariance for each of the plurality of sub-solutions;
  calculate a heading covariance for the main navigation solution;
  calculate a heading covariance for the magnetic calibration filter;
  approximate a plurality of sub-solution heading covariances corresponding to the magnetic calibration filter based on a ratio between the heading covariance for the main navigation solution and the heading covariance for each of the plurality of sub-solutions being approximately equal to a ratio between the heading covariance for the magnetic calibration filter and each of the sub-solution heading covariances corresponding to the magnetic calibration filter; and
  determine a protection limit that bounds error in the state for heading of the object based on respective separations between the heading covariance for the magnetic calibration filter and each of the sub-solution heading covariances corresponding to the magnetic calibration filter.

* * * * *